United States Patent Office 2,796,101
Patented June 18, 1957

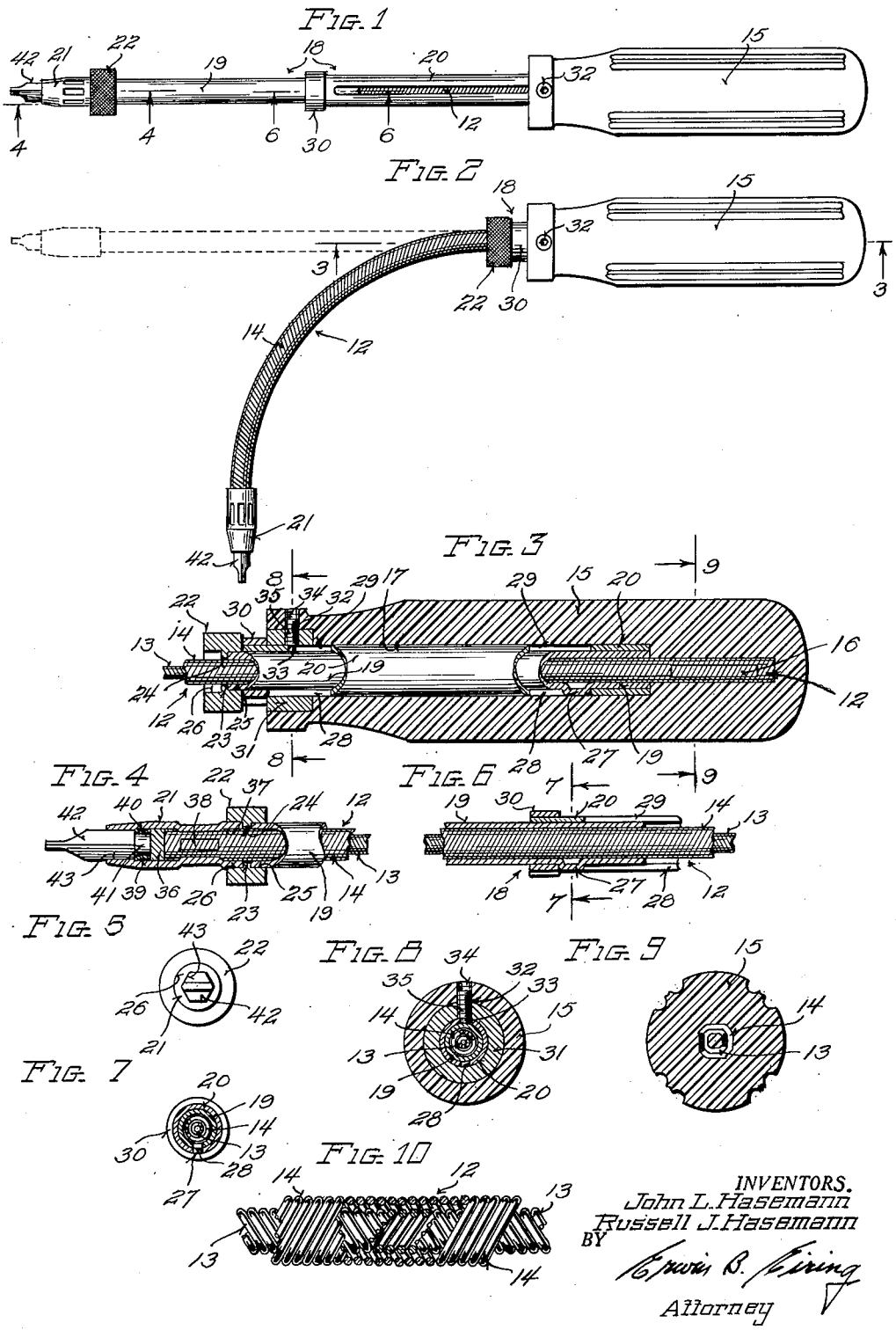

2,796,101

COMBINATION RIGID AND FLEXIBLE HAND TOOL

John L. Hasemann, Livingston, and Russell J. Hasemann, West Caldwell, N. J., assignors, by mesne assignments, to Robertshaw-Fulton Controls Company, Greensburg, Pa., a corporation of Delaware Application September 28, 1954, Serial No. 458,814

4 Claims. (Cl. 145—61)

This invention relates to a combination rigid and flexible hand tool for setting and unsetting nuts, bolts and screws.

While rigid hand tools of various forms are in common use for setting and unsetting nuts, bolts and screws and while numerous flexible hand tools have been designed and employed for use in special instances where ready accessibility to the work at hand is difficult, to the best of our knowledge no single hand tool has ever been provided which is adapted for substantially instantaneous conversion for selective use in either rigid or flexible condition.

In the design and fabrication of modern machines and equipment, there are numerous instances in which the required location of nuts, bolts and screws, render access to the particular parts rather difficult and requires the use of either specially formed tools or those having a flexible shank adapted for bending to provide a suitable means for setting or unsetting nuts, bolts and screws.

The main purpose of the present combination rigid and flexible hand tool is to provide a single, simple, comparatively inexpensive hand tool adapted for selective substantially instantaneous conversion, at the will of the mechanic, from rigid to flexible form to more readily adapt it for use in all situations even where the nut, bolt or screw to be manipulated is not readily accessible to a rigid tool.

The primary object of the present invention resides in the provision of a new and improved hand tool adapted for substantially instantaneous conversion for selective use in either rigid or flexible condition for setting or unsetting nuts, bolts and screws.

Another object of the present invention resides in the provision of a new and improved hand tool including a flexible torque transmitting shank in combination with an encircling rigid sheath which is axially adjustable on the flexible shank to encase the same and preclude any flexing of the shank to provide a rigid tool or adjustable to vary the length of the unsheathed portion of the shank to thereby permit flexure of the shank to provide a flexible tool.

Another object of the present invention resides in the provision in a combination rigid and flexible hand tool of a normally straight flexible torque transmitting shank composed of a plurality of adjacent walls formed of oppositely wound superimposed layers of high tensile steel wires. The opposite hand winding of the adjacent layers of the flexible shank serving to transmit substantially equal torque in either direction of rotation of the flexible shank.

Another object of the invention resides in a combination rigid and flexible hand tool of a telescopically arranged sheath or jacket encasing a flexible torque transmitting shank and slidable over the shank to selectively render the shank incapable of bending to form a rigid tool or adjustable to vary the length of the exposed portion of the flexible shank to regulate and control the degree of flexing of the shank to form a flexible tool.

Another object of the invention resides in the provision of a new and improved combination rigid and flexible hand tool for setting and unsetting nuts, bolts and screws which includes a normally straight flexible torque transmitting shank portion having one end fixedly mounted in a handle and provided at its other end with a bit-receiving chuck and a rigid sheath or casing slidably receivable in the handle and adapted to surround the housed portion of the flexible shank and arranged for sliding movement to its extended position wherein it embraces the flexible shank and a portion of the chuck to preclude the bending of the flexible shank to thereby provide a rigid tool and adapted in its retracted position to permit the flexing of the exposed portion of the shank to form a flexible tool.

A more specific object of the invention resides in the provision in a combination rigid and flexible hand tool of a bit-receiving chuck adapted to releasably retain various sizes and forms of screwdriver bits and also various sizes and forms of bits for the setting and unsetting of nuts and bolts.

Another specific object of the present invention resides in the provision in a combination rigid and flexible hand tool including a normally straight flexible torque transmitting shank having one end fixedly attached to an operating handle and the other or free end carrying a bit-receiving chuck and a telescopically arranged rigid shield adapted for storage within the handle when in its retracted position to render the normally straight flexible shank capable of being deflected to form a flexible tool and when in its extended position providing a sheath adapted to preclude the deflection of the flexible shank and thereby form a rigid tool.

Other objects and advantages will become apparent from the following description of an illustrative embodiment of the present invention.

In the drawing:

Figure 1 is a side elevational view of a combination rigid and flexible hand tool, constructed in accordance with the teachings of the present invention, showing the same in its rigid form;

Fig. 2 is a side elevational view similar to that shown in Fig. 1 with the shank encircling sheath in retracted position to permit the flexing of the exposed portion of the shank to provide a flexible tool;

Fig. 3 is an enlarged vertical longitudinal sectional view, taken on the line 3—3 of Fig. 2 showing the telescopically arranged shank encircling sheath in retracted position;

Fig. 4 is an enlarged vertical longitudinal sectional view taken substantially on the line 4—4 of Fig. 1 showing the bit-receiving chuck mounted on the free end of the flexible shank together with the forward extremity of the telescopically arranged rigid shank encircling sheath illustrating the means for selectively maintaining the tool rigid;

Fig. 5 is a front elevational view of the bit-receiving chuck shown in Fig. 4;

Fig. 6 is an enlarged vertical longitudinal sectional view taken substantially on the line 6—6 of Fig. 1 showing the associated elements of the telescopically arranged shank encircling sheath together with means for limiting the extent of their relative movement in one direction;

Fig. 7 is a vertical transverse sectional view taken on the line 7—7 of Fig. 6;

Fig. 8 is a vertical transverse sectional view through the handle, taken on the line 8—8 of Fig. 3 showing the relative associated positions of the flexible shank, the surrounding telescopically arranged rigid sheath and the means for maintaining the sheath against rotation with respect to the handle;

Fig. 9 is a vertical transverse sectional view through the handle taken on the line 9—9 of Fig. 3 showing the means for fixedly retaining one end of the flexible shank in the handle; and Fig. 10 is an enlarged fragmentary elevational view, partly in section showing the construction of the flexible shank portion of the tool.

Before entering into a detailed description of the embodiment of the present invention chosen for illustrative purposes in the accompanying drawing, it is believed that reference should be made to the fact that the combination rigid and flexible hand tool therein illustrated may be used with equal facility for setting and unsetting nuts, bolts and screws by the selective removable application of any suitably shaped bit in the bit-receiving chuck fixedly mounted on the free end of the torque transmitting flexible shank.

Referring more particularly to Fig. 1 of the accompanying drawing, it will be noted that the tool therein illustrated is in rigid form. The full line showing of the tool in Fig. 2 illustrates the available flexibility of the torque transmitting shank when the telescopically arranged shank surrounding sheath has been retracted into the handle and the flexible shank deflected from its normally straight position indicated in dotted line showing in this figure.

Referring more particularly to Figs. 3 and 10 of the accompanying drawing, it will be noted that a flexible torque transmitting shank 12 therein shown is composed of a plurality of oppositely wound superimposed layers of helical coils of wire 13 and 14 wound consecutively one upon the other. The number of superimposed layers of oppositely wound wires in the flexible torque transmitting shank may be varied in accordance with the required strength of the tool. It should also be noted at this time that the individual wires of each of the tightly wound coils 13 and 14 normally lie in abutting relationship with the adjacent turns of the coil. The opposite hand winding of coils 13 and 14 serve to provide a normally straight flexible shank having the inherent ability to transmit substantially equal torque in either direction of rotation due to the contact between the adjacent turns of each coil 13 and 14 and the opposite hand winding of the coils 13 and 14. Rotation of the flexible torque transmitting shank 12 in one direction tends to tighten one of the coils while rotation of the shank in the opposite direction tends to tighten the other coil to thus provide adequate torque transmitting power in either direction of rotation.

One end of the flexible torque transmitting shank 12 is fixedly positioned within a handle 15 of the device in any suitable manner such as by pressing or molding. As illustrated in Fig. 3, we have chosen to anchor the end of the shank 12 by pressing the handle 15, formed of a plastic or other suitable material, directly onto one end of the flexible shank which may be provided with flatted surfaces 16 to preclude the possibility of relative movement between the handle 15 and the flexible shank 12. The handle 15 is provided with a centrally disposed axial bore or recess 17 adapted to contain and house the portion of the flexible shank 12 adjacent the portion of the shank which is fixedly mounted in the handle 15. The axial bore or recess 17 also serves to house a rigid sheath or casing 18. The rigid sheath or casing comprises a pair of telescopically arranged inner and outer tubular members 19 and 20 respectively. These members may have a frictional sliding fit and may be formed in any suitable manner so as to either permit or preclude relative rotational movement between them. The telescopically arranged rigid sheath or casing 18 may be made as a subassembly and slidably mounted on the free end of the flexible torque transmitting shank 12 prior to the fixed mounting of a bit-receiving chuck 21 on the free end of the flexible shank 12 and the anchoring of the other end of the sheath 18 in the bore 17 of the handle 15.

A collar 22 is fixedly mounted on the outer or free end of the inner tubular member 19. A collar 22 includes a partition 23 having a central axially disposed opening 24 adapted for sliding movement along the outer surface of the flexible torque transmitting shank 12. A recess 25 formed at one end of the collar 22 provides a socket to slidably receive the outer end portion of the tubular member 19 which is secured within the recess 25 in any suitable manner. A similar recess 26 formed on the opposite end of the collar 22 forms a socket adapted to slidably receive the inner end of the bit-receiving chuck 21.

A tang or boss 27 which is struck outwardly from the surface of the tubular member 19 adjacent its inner end is adapted for sliding movement in a longitudinally disposed slot 28 formed in the outer tubular member 20. The outer tubular member 20 is provided with a second longitudinally extending slot 29 for a purpose to be hereinafter described. A ring or collar 30 is fixedly attached to the outer or free end of the tubular member 20 to provide a means for limiting both the retracting movement of the member 20 into the recess 17 of the handle 15 and also serves as an abutment for the tang 27 to limit relative movement between the outer and inner tubular members 19 and 20 when they are in extreme extended position.

A ring 31 fixedly positioned in the handle 15 and surrounding the mouth of the axial bore 17 forms a guide for the telescopic movement of the rigid sheath or casing 18 in the handle 15. After the rigid sheath or casing 18 has been assembled, it is slidably received over the free end of the flexible torque transmitting shank 12 and slid through the opening in the ring 31 to a position in which the major portion of both of the tubular members 19 and 20 are disposed within the recess 17 formed in the handle 15. A set screw 32 provided with a reduced end portion 33 is threadedly received in aligned radial holes 34 and 35 formed respectively in the handle 15 and ring 31 so that reduced end portion 33 of the set screw is disposed within the slot 29 formed in the outer tubular member 20 to insure against relative rotational movement between the handle 15 and the telescopically arranged rigid sheath 18. Abutment between the reduced end portion 33 of the set screw 32 with the inner end of the slot 29 formed in the outer tubular member 20 serves to limit the extended movement of the member 20 with respect to the handle 15.

The bit-receiving chuck 21 includes a transversely disposed partition 36 which defines the base of a substantially cylindrical socket 37 adapted to slidably receive the forward or free end of the flexible torque transmitting shank 12. The forward portion of the flexible torque transmitting shank 12 may be provided with suitable flattened portions 38 and the relatively thin wall of the socket 37 may be crimped or otherwise deformed to provide a means for fixedly securing the bit-receiving chuck 21 on the free end of the flexible torque transmitting shank 12. A socket 39 disposed at the forward side of the partition 36 in the bit-receiving chuck 21 serves to receive a suitably shaped ribbon-like spring member 40 adapted to frictionally contact and releasably retain the inner end portion 41 of a removable bit 42. Referring more particularly to Fig. 5 of the accompanying drawing, it will be noted that the removable bit 42 is hexagonal to conform with the shape of a mouth 43 of the bit-receiving chuck 21. The identical polygonal shapes of the bit 42 and mouth 43 serve to preclude relative angular movement between the bit and bit-receiving chuck so that the torsional force of the flexible shank 12 is transmitted directly to the bit 42 which may be of any suitable form such as a blade for insertion into the kerf of a screw or a socket adapted to be applied to the polygonal head of a bolt or a nut.

When it is desired to use the hand tool in rigid condition, the telescopically arranged sheath 18 is extended to its full length to form a rigid case surrounding the previously exposed portion of the flexible torque transmitting shank 12. When the rigid telescopically arranged sheath or casing 18 is in its fully extended position, the socket 26 formed in the collar 22 is adapted to surround and slidably receive the rearward portion of the bit-receiving chuck 21 to form a rigid guide which precludes any deflection of the flexible torque transmitting shank 12 to thereby form a rigid tool.

When it is desired to use the hand tool in flexible condition, the telescopically arranged sheath or casing 18 is retracted to the position shown in Fig. 3 wherein the exposed portion of the normally straight flexible torque transmitting shank 12 is free to be deflected to facilitate the application of a suitable bit 42, releasably retained in the bit-receiving chuck 21, to the nut, bolt or screw to be manipulated.

In both rigid and flexible conditions, turning movement of the handle 15 results in the transmission of torque through the flexible shank 12 to the bit-receiving chuck 21 whether the flexible shank 12 is incased in the rigid telescopically arranged sheath 18 or whether it is completely exposed and in either straight or deflected position.

From the foregoing detailed description of the present invention, it will be noted that a simple and effective combination rigid and flexible hand tool has been provided which may be substantially instantaneously converted from rigid to flexible or flexible to rigid condition at the will of the user.

While the invention has been described in considerable detail in the foregoing specification, it is to be understood that various changes may be made in its embodiment without departing or sacrificing any of the advantages hereafter claimed.

We claim:

1. A combination rigid and flexible hand tool for setting and unsetting screws and nuts, said tool comprising a flexible torque transmitting shank, a gripping handle fixedly mounted on one end of said flexible shank, a bit-receiving chuck mounted on the other end of said shank, and a rigid sheath slidably mounted on said flexible shank, said handle including a recess forming a housing for a portion of said flexible shank and adapted to slidably receive said rigid sheath, said sheath being selectively extendable to provide a rigid casing for said flexible shank to form a rigid tool and retractable into said handle to render the exposed portion of said shank capable of being deflected to form a flexible tool.

2. A combination rigid and flexible hand tool, as set forth in claim 1, in which the rigid sheath comprises a plurality of telescopically arranged members.

3. A combination rigid and flexible hand tool for setting or unsetting screws or nuts, said tool comprising a flexible torque transmitting shank including a plurality of adjacent walls respectively formed of a closely wound spiral of wires, said walls being of opposite hand windings to provide a normally straight shank having substantially equal torque transmitting power upon rotation in either direction, a gripping handle fixedly mounted on one end of said flexible shank, a bit-receiving chuck mounted on the other end of said shank, and a rigid sheath slidably mounted on said shank and slidably receivable in said handle, said handle including a recess forming a housing for a portion of said flexible shank and adapted to slidably receive said rigid sheath, said rigid sheath being selectively extendable to provide a rigid casing for said flexible shank to form a rigid tool and retractable into said handle to render the exposed portion of said shank capable of being deflected to form a flexible tool.

4. A combination rigid and flexible hand tool, as set forth in claim 3, in which the rigid sheath comprises a plurality of telescopically arranged members.

References Cited in the file of this patent
UNITED STATES PATENTS

| | | |
|---|---|---|
| 1,056,084 | Bates | Mar. 18, 1913 |
| 1,267,915 | Shell | May 28, 1918 |
| 2,023,693 | Miller | Dec. 10, 1935 |
| 2,486,043 | Lofgren | Oct. 25, 1949 |

FOREIGN PATENTS

| | | |
|---|---|---|
| 408,895 | Great Britain | Apr. 19, 1934 |
| 605,130 | Great Britain | July 16, 1948 |